United States Patent
Zhang et al.

(10) Patent No.: US 12,047,442 B1
(45) Date of Patent: Jul. 23, 2024

(54) CONFIGURING A REPLACEMENT NODE USING A CONFIGURATION BACKUP OF A FAILED NODE BEING REPLACED

(71) Applicant: Lenovo Enterprise Solutions (Singapore) Pte Ltd., Singapore (SG)

(72) Inventors: Caihong Zhang, Shanghai (CN); Zhi Wang, Shanghai (CN); Fred Allison Bower, III, Durham, NC (US); Ming Lei, Shanghai (CN)

(*) Notice: Subject to any disclaimer, the term of this patent is extended or adjusted under 35 U.S.C. 154(b) by 0 days.

(21) Appl. No.: 18/487,322

(22) Filed: Oct. 16, 2023

Related U.S. Application Data

(63) Continuation of application No. PCT/CN2023/090749, filed on Apr. 26, 2023.

(51) Int. Cl.
  *H04L 67/104* (2022.01)
  *H04L 67/1042* (2022.01)

(52) U.S. Cl.
  CPC ...... *H04L 67/1048* (2013.01); *H04L 67/1042* (2013.01)

(58) Field of Classification Search
  CPC .............. H04L 67/1048; H04L 67/1042
  See application file for complete search history.

(56) References Cited

U.S. PATENT DOCUMENTS

| | | | | |
|---|---|---|---|---|
| 2012/0151550 A1* | 6/2012 | Zhang | ............... | H04N 21/2405 725/148 |
| 2019/0342383 A1* | 11/2019 | Matican | ................. | H04L 67/10 |
| 2020/0133793 A1* | 4/2020 | Greenwood | ........ | G06F 11/2094 |
| 2020/0310394 A1* | 10/2020 | Wouhaybi | ................ | G06F 8/65 |
| 2020/0334113 A1* | 10/2020 | Sanakkayala | ......... | G06F 11/203 |
| 2022/0276929 A1* | 9/2022 | Prashant | ............. | G06F 11/1662 |

* cited by examiner

*Primary Examiner* — Chris Parry
*Assistant Examiner* — Steven C Nguyen
(74) *Attorney, Agent, or Firm* — Jeffrey L. Streets

(57) ABSTRACT

A replacement node replaces a failed node and a baseboard management controller (BMC) for the replacement node generates a nonce code that is accessible to an authenticated user. An edge management node receives the nonce code from the user and sends a maintenance token to a BMC of a peer node in an edge cluster, wherein the peer nodes BMCs within the cluster are in a BMC federation that included the failed node BMC and have access to a BMC configuration for the failed node. The management node sends the token and the nonce code to the replacement node BMC for authentication of the token. The peer node BMC sends the token received from the management node to the replacement node BMC for authentication of the peer node BMC. The authenticated peer node BMC may then deploy the BMC configuration to the replacement node BMC.

20 Claims, 6 Drawing Sheets

CONFIGURING A REPLACEMENT NODE USING A CONFIGURATION BACKUP OF A FAILED NODE BEING REPLACED

BACKGROUND

The present disclosure relates to replacing a failed node in a cluster with a replacement node.

BACKGROUND OF THE RELATED ART

A cluster of nodes may be deployed to perform one or more specific tasks in a given operating environment. In order to support performance of these tasks, each node in the cluster must have hardware of an appropriate type and capacity. Each node in the cluster must also be configured with settings that enable the hardware to communicate with the other cluster nodes and a cluster management node. With extended use of the cluster, one of the cluster nodes may eventually experience a failure and need to be replaced. In order to replace the failed node with a replacement node, a service person with suitable knowledge and system credentials may travel to the location of the operating environment to install and configure the replacement node.

BRIEF SUMMARY

Some embodiments provide a method comprising a replacement node being connected to an edge cluster switch to replace a failed node and a baseboard management controller of the replacement node generating a nonce code that is viewable through a baseboard management controller web interface to an authenticated user. The method further comprises an edge management node receiving the nonce code from the authenticated user and the edge management node sending a maintenance token to a baseboard management controller of a peer node in the edge cluster, wherein the baseboard management controller of the peer node is in a baseboard management controller federation that included the baseboard management controller of the failed node and the baseboard management controller of the peer node has access to a baseboard management controller configuration for the failed node. Still further, the method comprises the edge management node sending the maintenance token and the nonce code to the baseboard management controller of the replacement node, as well as the baseboard management controller of the replacement node receiving the nonce code from the edge management node and authenticating the maintenance token received from the edge management node in response to determining that the nonce code received from edge management node matches the nonce code generated by the baseboard management controller of the replacement node. In addition, the method comprises the baseboard management controller of the peer node sending the maintenance token received from the edge management node to the baseboard management controller of the replacement node, the baseboard management controller of the replacement node receiving the maintenance token from the baseboard management controller of the peer node and authenticating the baseboard management controller of the peer node in response to determining that the maintenance token received from the baseboard management controller of the peer node matches the authenticated maintenance token that the baseboard management controller of the replacement node received from the edge management node, and the authenticated baseboard management controller of the peer node deploying the baseboard management controller configuration for the failed node to the baseboard management controller of the replacement node.

Some embodiments provide a computer program product comprising a non-volatile computer readable medium and non-transitory program instructions embodied therein, the program instructions being configured to be executable by a processor of a baseboard management controller to cause the processor to perform various operations. The operations may comprise generating a first nonce code that is viewable through a baseboard management controller web interface, receiving a second nonce code and a first maintenance token from an edge management node, receiving a second maintenance token and a baseboard management controller configuration from a peer node within the cluster, and implementing the received baseboard management controller configuration in response to determining that the second nonce code received from the edge management node matches the previously generated first nonce code and determining that the second maintenance token received from the peer node matches the first maintenance token received from the edge management node. Without limitation, the foregoing operations may be performed by a replacement node.

Some embodiments provide a computer program product comprising a non-volatile computer readable medium and non-transitory program instructions embodied therein, the program instructions being configured to be executable by a processor to cause the processor of a baseboard management controller to perform various operations. The operations comprise participating in a baseboard management controller federation with a first peer node and storing a backup of a baseboard management controller configuration for the first peer node. Subsequently operations comprise detecting that the first peer node has been replaced with a second (replacement) peer node, receiving a maintenance token from an edge management node, and sending the maintenance token and at least a portion of the stored backup of the baseboard management controller configuration for the first peer node to the second (replacement) peer node. Without limitation, the foregoing operations may be performed by a peer node that is operational and remains in the baseboard management controller federation.

DETAILED DESCRIPTION

Figure 1:
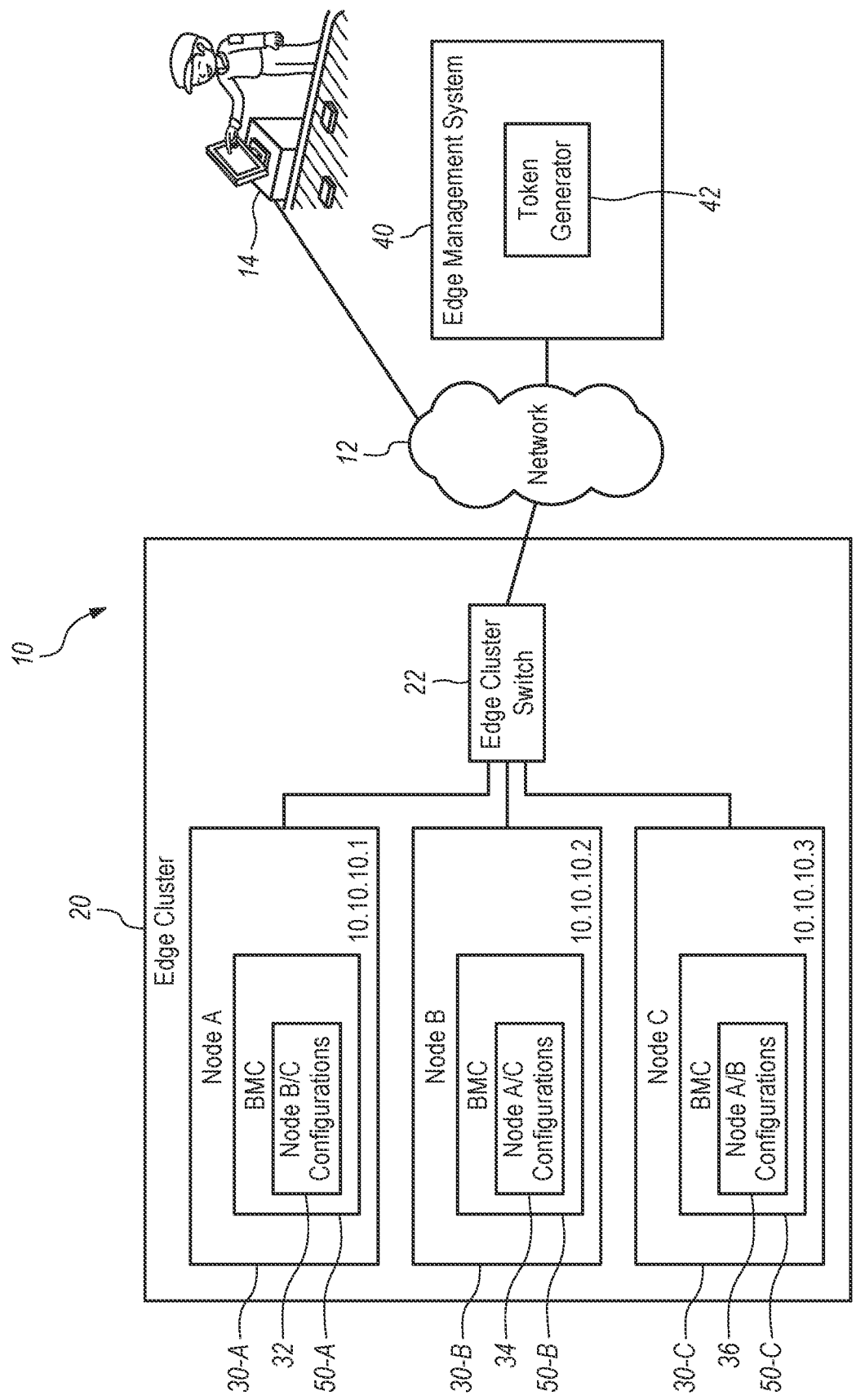
FIG. 1 is a diagram of a system including an edge cluster with multiple edge nodes each having a baseboard management controller that is a member of a baseboard management controller federation.

Some embodiments provide a method comprising a replacement node being connected to an edge cluster switch to replace a failed node and a baseboard management controller of the replacement node generating a nonce code that is viewable through a baseboard management controller web interface to an authenticated user. The method further comprises an edge management node receiving the nonce code from the authenticated user and the edge management node sending a maintenance token to a baseboard management controller of a peer node in the edge cluster, wherein the baseboard management controller of the peer node is in a baseboard management controller federation that included the baseboard management controller of the failed node and the baseboard management controller of the peer node has access to a baseboard management controller configuration for the failed node. Still further, the method comprises the edge management node sending the maintenance token and the nonce code to the baseboard management controller of the replacement node, as well as the baseboard management controller of the replacement node receiving the nonce code from the edge management node and authenticating the maintenance token received from the edge management node in response to determining that the nonce code received from edge management node matches the nonce code generated by the baseboard management controller of the replacement node. In addition, the method comprises the baseboard management controller of the peer node sending the maintenance token received from the edge management node to the baseboard management controller of the replacement node, the baseboard management controller of the replacement node receiving the maintenance token from the baseboard management controller of the peer node and authenticating the baseboard management controller of the peer node in response to determining that the maintenance token received from the baseboard management controller of the peer node matches the authenticated maintenance token that the baseboard management controller of the replacement node received from the edge management node, and the authenticated baseboard management controller of the peer node deploying the baseboard management controller configuration for the failed node to the baseboard management controller of the replacement node.

The edge cluster, also referred to as an edge store, includes a group of peer nodes. Each node is a computer, such as a server. Embodiments of the edge cluster may include any number of two or more peer nodes, such that at least one peer node remains operational while the other peer node experiences a failure and is replaced with a replacement peer node. Each of the peer nodes in the edge cluster, including the failed peer node and the replacement peer node, include a baseboard management controller (BMC). One example of a baseboard management controller having expanded capabilities is a Lenovo XClarity Controller (XCC).

A baseboard management controller (BMC) is a small computer that resides on a motherboard of a server and some other devices, such as higher-end switches, to provide remote monitoring and control of the server. Redfish is the current standard used to expose the BMC functions as defined by the Distributed Management Task Force (DMTF) and largely replaces the older Intelligent Platform Management Interface (IPMI) standard. The BMC is a specialized microcontroller that is embedded on the motherboard of a computer server and has its own firmware and memory. The BMC manages the interface between system-management software and platform hardware.

The BMC may monitor the server hardware by receiving input from various sensors built into the server, including such input as component temperatures, cooling fan speeds, power status, and the like. Furthermore, the BMC can send alerts and operating data to a system administrator over a network under various conditions. The administrator or other authenticated user may also remotely communicate with the BMC to take some corrective actions, such as resetting or power cycling the server to get a hung operating system running again, as well as to obtain information, such as the nonce code generated by a replacement node. Some BMCs may also have out-of-band embedded web-server interface functionality, enabling an administrator to monitor and take action via the BMC from a remote computer with a web-browser. Other out-of-band interfaces include an Intelligent Platform Management Interface (IPMI), Redfish interface, and Common Information Model (CIM) interface.

Some embodiments may use BMC federation or group management functionality to form a virtual federation group ("BMC group") for managing any of the servers in the group via the BMC interface. After forming a BMC group, the BMC group may be used for various functions, such as to increase the speed and/or efficiency of deploying configurations, perform firmware or operating system update, and/or other information or commands among neighbor servers in a local network. For example, each of the peer nodes may have a baseboard management controller that is a member of the federation. The baseboard management controllers may communicate for one or more purpose, such as authentication, exchange of hardware inventory, exchange of network topology, storing a backup of baseboard management controller configuration, and deploying the backup of the baseboard management controller configuration on a replacement node.

In some embodiments, the maintenance token may be a software object that may be used to authenticate an entity. Specifically, the maintenance token is an object that a peer node may submit to a replacement node as authentication of the peer node. In one option, the maintenance token may be valid for only a single-use and/or a predetermined duration after being sent by the edge management node.

In some embodiments, the edge management node may be local or co-located with the edge cluster, but it typically not one of the peer nodes within the cluster. Accordingly, the edge management node may be used to control and/or manage the edge cluster and the peer nodes within the edge cluster. Alternatively, the edge management node may be in some remote location relative to the edge cluster but may still be used to control and/or manage the edge cluster and the peer nodes within the edge cluster. Whether the edge management node is local or remotely located relative to the edge cluster, the edge management node may communicate with the individual peer nodes of the edge cluster via one or more network. For example, the edge management node may be directly or indirectly connected to an edge cluster switch to which the peer nodes are directly connected.

The term "nonce", as used herein, refers to a unique code that is intended to be used in support of a single transaction. The nonce code may include various types and numbers of characters but is typically sufficiently complex as to make it impractical that another entity might guess the nonce code. For example, a baseboard management controller may generate a numerical nonce code that is some fixed number of digits that are selected using a random number generator. The nonce code may, without limitation, be numerical, binary, or alphanumerical.

In some embodiments, the node that is removed from the edge cluster is referred to as a "failed node". The nature or extent of the failure experienced by the node is not relevant and may include performance degradation, warranty expiration, or inadequate performance for the current requirements of the edge cluster. Both the "failed node" and the "replacement node" should be considered to be peer nodes within the edge cluster. However, the "failed node" ceases to be a peer node upon failure or removal from the edge cluster and the "replacement node" becomes a peer node upon installation with the edge cluster and configuration of the baseboard management controller of the replacement node.

In some embodiments, the method may further comprise the authenticated peer node obtaining a hardware inventory of the replacement node from the replacement node, and the authenticated peer node determining whether the hardware inventory is consistent with a hardware inventory of the peer node. For example, the stored baseboard management controller configuration may be deployed on the baseboard management controller of the replacement node only in response to determining that the hardware inventory of the replacement node is consistent with the hardware inventory of the peer node. In other words, the authenticated peer node may verify that the replacement node is a suitable peer node to be included in the baseboard management controller federation within the edge cluster. In an environment including multiple clusters, if the replacement node is not consistent with the hardware configuration of the peer node then it may be the case that the replacement node has been installed in the wrong cluster.

In some embodiments, the method may further comprise the authenticated peer node obtaining a network topology of the replacement node, and the authenticated peer node determining whether the network topology of the replacement node is consistent with a network topology of the peer node. For example, the stored baseboard management controller configuration may be deployed on the baseboard management controller of the replacement node only in response to determining that the network topology of the replacement node is consistent with the network topology of the peer node. In other words, the authenticated peer node may verify that the replacement node has a network topology that is conducive to being included in the baseboard management controller federation within the edge cluster. In one option, the network topology of the replacement node may be determined to be consistent with the network topology of the peer node if the replacement node uses a Peripheral Component Interconnect Express slot identifier for a network adapter that is the same as a Peripheral Component Interconnect Express slot identifier for a network adapter of the peer node. In another option, the network topology of the replacement node may be determined to be consistent with the network topology of the peer node if the replacement node has a network adapter connected to a cluster switch that is the same as the cluster switch to which a network adapter of the peer node is connected. Preferably, the network topology of the replacement node is identical to the network topology of all of the other peer nodes remaining in the BMC federation. For example, if the remaining nodes within the BMC federation are cabled directly to a local cluster switch, then the replacement node may be found to have "consistent" network cabling or topology if the replacement node is also cabled directly to the same local cluster switch. A cable connection to a different switch would cause a finding of an "inconsistent" network cabling or topology.

In some embodiments, either or both of the foregoing hardware inventory consistency check and the network topology consistency check may be performed comparing the replacement node to any one or more of the peer nodes remaining in the baseboard management controller federation. In many preferred implementations, each of the peer nodes within the baseboard management controller federation will have the same hardware inventory and/or the same network topology.

In some embodiments, each baseboard management controller in the baseboard management controller federation may periodically backup the baseboard management controller configuration of each of the other baseboard management controllers in the baseboard management controller federation. Accordingly, the backup should represent a current or recent baseboard management controller configuration for each baseboard management controller within the federation. Should any of the edge cluster peer nodes experience a failure and require replacing with a replacement node, another peer node having a baseboard management controller within the federation will have access to a backup of the baseboard management controller configuration for the failed node and be able to deploy that backup configuration, or at least a portion of the backup configuration, to the replacement node being installed in the edge cluster. Optionally, the baseboard management controllers within the federation may negotiate and elect one of the baseboard management controllers within the federation to handle the deployment the baseboard management controller configuration to the replacement node.

Therefore, the replacement node may be easily and quickly be made to perform properly within the edge cluster and as a member of the baseboard management controller federation. It is a technological benefit that a user or administrator does not need to directly interface with the replacement node to provide a baseboard management controller configuration to the baseboard management controller of the replacement node. Optionally, the backup of the baseboard management controller configuration may include a baseboard management controller Internet Protocol address, a baseboard management controller Universally Unique Identifier, and/or Unified Extensible Firmware Interface configuration.

Some embodiments provide a computer program product comprising a non-volatile computer readable medium and non-transitory program instructions embodied therein, the program instructions being configured to be executable by a processor of a baseboard management controller to cause the processor to perform various operations. The operations may comprise generating a first nonce code that is viewable through a baseboard management controller web interface, receiving a second nonce code and a first maintenance token from an edge management node, receiving a second maintenance token and a baseboard management controller configuration from a peer node within the cluster, and implementing the received baseboard management controller configuration in response to determining that the second nonce code received from the edge management node matches the previously generated first nonce code and determining that the second maintenance token received from the peer node matches the first maintenance token received from the edge management node. Without limitation, the foregoing operations may be performed by a replacement node.

In some embodiments, the operations may further comprise granting administrative privileges to the peer node in response to determining that the second nonce code received from the edge management node matches the previously generated first nonce code and determining that the second maintenance token received from the peer node matches the first maintenance token received from the edge management node. By granting the administrative privileges to the peer node, the peer node may take a wide variety of actions, including requests for information about the replacement node and instructions for replacement node to take certain actions. Specifically, the baseboard management controller of the peer node may use a Redfish application programming interface (API) or command to control or manage the baseboard management controller of the replacement node. In one option, the operations may include providing a hardware inventory to the peer node in response to a hardware inventory request received from the peer node that has been granted the administrative privileges. For example, the hardware inventory may identify certain hardware in the replacement node. In another option, the operations may include providing network topology data to the peer node in response to a network topology request received from the peer node that has been granted the administrative privileges. For example, the network topology data may identify a Peripheral Component Interconnect Express slot identifier where a host network adapter is installed in the replacement node including the baseboard management controller and/or identifies a network switch to which the replacement node is connected.

Some embodiments provide a computer program product comprising a non-volatile computer readable medium and non-transitory program instructions embodied therein, the program instructions being configured to be executable by a processor to cause the processor of a baseboard management controller to perform various operations. The operations comprise participating in a baseboard management controller federation with a first peer node and storing a backup of a baseboard management controller configuration for the first peer node. Subsequently operations comprise detecting that the first peer node has been replaced with a second (replacement) peer node, receiving a maintenance token from an edge management node, and sending the maintenance token and at least a portion of the stored backup of the baseboard management controller configuration for the first peer node to the second (replacement) peer node. Without limitation, the foregoing operations may be performed by a peer node that is operational and remains in the baseboard management controller federation.

In some embodiments of the foregoing computer program product, the operations may further comprise obtaining a hardware inventory from the second peer node and determining whether the hardware inventory is consistent with a hardware inventory of one or more peer nodes in the baseboard management controller federation. Furthermore, the stored baseboard management controller configuration may, for example, be sent to the baseboard management controller of the second peer node only in response to determining that the hardware inventory of the second peer node is consistent with the hardware inventory of the one or more peer nodes in the baseboard management controller federation. In one option, the operations may further comprise generating a hardware inconsistency event that is viewable through a baseboard management controller web interface in response to determining that the hardware inventory of the second peer node is not consistent with the hardware inventory of the one or more other peer nodes in the baseboard management controller federation.

In some embodiments of the foregoing computer program product, the operations may further comprise obtaining network topology data from the second peer node and determining whether the network topology data obtained from the second peer node is consistent with a network topology of one or more other peer nodes in the baseboard management controller federation. Furthermore, the stored backup of the baseboard management controller configuration for the first peer node may, for example, be sent to the baseboard management controller of the second peer node only in response to determining that the network topology data obtained from the second peer node is consistent with the network topology of the one or more other peer nodes in the baseboard management controller federation. In one option, the network topology data may identify a Peripheral Component Interconnect Express slot identifier where a host network adapter is installed in a local node including the baseboard management controller and/or identifies a network switch to which the local node is connected. In another option, the operations may further comprise generating a network topology inconsistency event that is viewable through a baseboard management controller web interface in response to determining that the network topology data obtained from the second peer node is not consistent with the network topology of the one or more other peer nodes in the baseboard management controller federation.

In some embodiments, the stored backup of the baseboard management controller configuration may include a baseboard management controller Internet Protocol address, a baseboard management controller Universally Unique Identifier, and/or Unified Extensible Firmware Interface configuration. Optionally, the operations may further comprise identifying that the second peer node is a replacement for the first peer node in response to detecting that the second peer node has a Universally Unique Identifier that is different from the Universally Unique Identifier in the stored backup of the baseboard management controller configuration for the first peer node.

The foregoing computer program products may further include program instructions for implementing or initiating any one or more aspects of the methods described herein. In particular, the computer program products may include program instructions for implementing or initiating the operations of any one entity that is involved in the methods. Optionally, a computer program product may support the operations of a baseboard management controller whether the baseboard management controller is a peer node remaining in the edge cluster or a replacement node being added to the edge cluster. Furthermore, the methods may include any of the operations described in the context of a computer program product.

FIG. 1 is a diagram of a system 10 including an edge cluster 20 with multiple edge nodes 30-A. 30-B, 30-C each having a baseboard management controller 50-A, 50-B, 50-C, respectively, that is a member of a baseboard management controller federation. For purposes of this limited illustration, the edge cluster 20 include three (3 nodes) although any number of nodes may be included, each of the nodes includes a baseboard management controller, and each baseboard management controller is a member of the same baseboard management controller federation. Other configurations may be implemented within the scope of the disclosed embodiments.

The edge cluster 20 further includes at least one edge cluster switch 22. The edge cluster switch 22 may be connected to a network adapter (not shown) of each node and/or each baseboard management controller to facilitate communication between the baseboard management controllers within the federation and to also facilitate communication between an edge management computer or system 40 and the baseboard management controllers. The edge management computer or system 40 includes a maintenance token generator 42. Optionally, the edge management system 40 may be a local system that may be connected directly to a port of the edge cluster switch 22 or a remote system that is connected to the edge cluster switch 22 through an internal and/or external network 12, such as a local area network or the Internet. In a further option, a computer 14 may be included in the system 10 to enable a user to access a baseboard management controller interface of any one of the baseboard management controllers, such as using a web browser.

As shown, the edge cluster or store 20 includes three peer servers or nodes, including Node A (30-A), Node B (30-B), and Node C (30-C). The baseboard management controllers 50-A, 50-B, 50-C of the three servers form a BMC federation. The three BMCs 50-A, 50-B, 50-C have IP addresses configured within the same subnet. For example, if the sub network (subnet) is 10.10.10.0/24, then the individual servers A, B and C may have IPS addresses of 10.10.10.1, 10.10.10.2, and 10.10.10.3, respectively. The BMCs within the BMC federation may access each other BMC within the BMC federation to back up its peer BMC configuration periodically for error recovery. The BMC configuration backup can include BMC IP, BMC UUID, BMC configuration and UEFI configuration etc. In the non-limiting example of FIG. 1. Node A may store backups of the BMC configurations for Nodes B and C (32), Node B may store backups of the BMC configurations for Nodes A and C (34), and Node C may store backups of the BMC configurations for Nodes A and B (36). Of course, a BMC may also store a backup of its own BMC configuration, if desired. During normal operation of the edge cluster 20, any change to the BMC configuration of one of the baseboard management controllers may cause the other BMCs to update their backup of the altered baseboard management controller configuration. Without limitation, such backups may be triggered immediately following the configuration change or all backups may be periodically updated.

Figure 2:
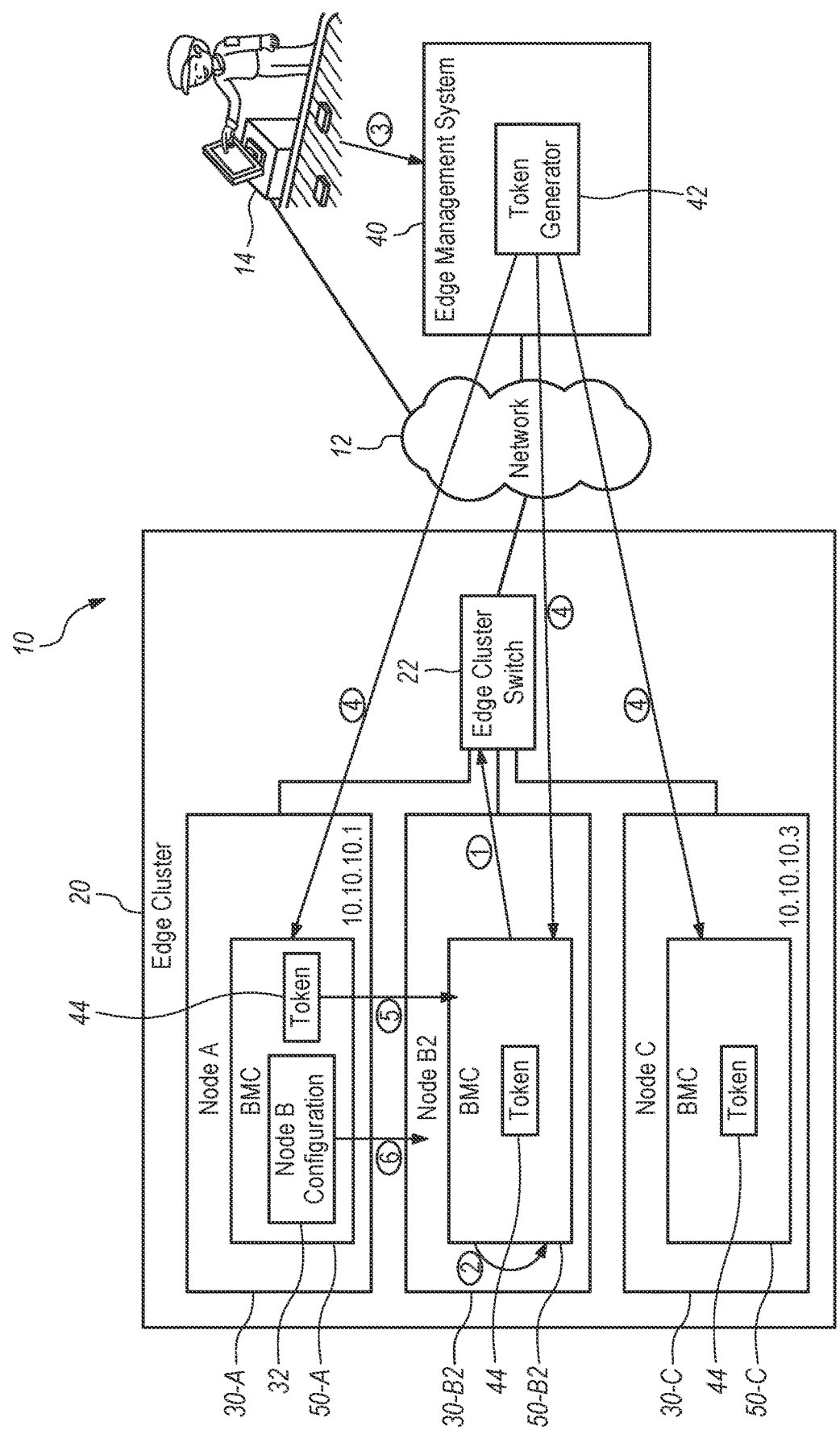
FIG. 2 is a diagram of the system of FIG. 1 after a failed node has been replaced with a replacement node.

FIG. 2 is a diagram of a system 10 including an edge cluster 20 with two of the edge nodes 30-A, 30-C previously shown in FIG. 1, as well as a replacement node 30-B2 that has replaced the previously shown node 30-B. Similar to the replace node 30-B (i.e., the failed node) the replacement node 30-B2 has a baseboard management controller 50-B2.

In one possible scenario, the server (Node B) of the edge cluster in FIG. 1 has experienced un-recoverable problems (i.e., a failure) and has been removed from the system 10. A replacement server (Node B2) has been shipped or otherwise provided to the edge cluster or store 20. For example, the replacement node 30-B2 may have BMC factory default settings with the default BMC IP 192.168.70.125. When the BMC 50-B2 of Node B2 50-B2 is connected to edge store network switch 22, the edge cluster switch 22 is assigned a static or Dynamic Host Configuration Protocol (DHCP) Internet Protocol (IP) address by the edge store network switch, such as 11.11.11.11 (see arrow labeled "1") and not the same as the original IP Address 10.10.10.2 that was assigned to the BMC in Node B.

The baseboard management controller 50-B2 of the replacement node 30-B2 generates a nonce code, such as 987654321 (see arrow labeled "2"). The baseboard management controller 50-B2 then makes the generated nonce code available or viewable in an edge node web graphical user interface (web GUI) or another BMC interface using the computer 14. Optionally, the baseboard management controller 50-B2 may generate the nonce code automatically or in response to a request from the edge management system 40.

The edge management system 40 performs a security check, such as personnel badge check, personal identification, fingerprint recognition, face recognition, eye recognition and/or other biometric identification for a user, administrator or staff attempting access to the management system 40. After the user passes the security check, the edge management system 40 may prompt for user input indicating whether BMC maintenance is needed. If the edge store staff or other authorized administrator provides input indicating that BMC maintenance is needed, then the edge management system 40 may determine that replacement node 30-B2 is a newly-added system. For example, the edge management node may store the Universally Unique Identifier (UUID) for each node in the edge cluster 20, then later detect a node with a UUID that does not match any of the previously stored UUIDs. The node with the new UUID is thus determined to be a newly added node and any previously stored UUID that is no longer in the edge cluster is determined to be missing or removed. When there is a newly added node and a missing node, the missing node may be referred to as a "replaced node" and the newly added node may be referred to as a "replacement node." In another example, a newly added node (i.e., replacement node) and a missing node (i.e., replaced node) may be identified by detecting current Internet Protocol (IP) addresses for the nodes in the edge cluster and comparing the detected IP addresses with previously stored IP addresses for nodes in the edge cluster. Accordingly, the edge management system 40 asks the user to input the nonce code generated by the baseboard management controller 50-B2 of the replacement node 30-B2. The authorized user should be able to access the nonce code by using, for example, the IP address of the BMC 50-B2 in a web browser.

After the edge store staff inputs the B2 nonce 987654321 to edge management system via the computer 14 (see arrow labeled "3"), the edge management system 40 will use a token generator 42 to generate and send a maintenance token 44 to the BMCs (50-A. 50-B) of the peer nodes (Node A 30-A. Node C 30-C) and the BMC (50-B2) of the replacement node (Node B2 30-B2) (see the three arrows labeled "4"). While the edge management system 40 has passed authentication with the BMCs of the edge nodes (Nodes A and C), the edge management system 40 has not been authenticated to the BMC 50-B2 of the replacement node 30-B2. In order to provide authentication to the BMC 50-B2 of the replacement node 30-B2, the edge management system 40 will send the nonce code (i.e., 987654321) that was entered by the user (see arrow labeled "3") as well as the maintenance token 44 to the BMC 50-B2 of the replacement node 30-B2. Since the BMC 50-B2 of the replacement node 30-B2 knows the nonce code that it previously generated, the receipt of a matching nonce code authenticates the edge management system 40 and the maintenance token 44 that the BMC 50-B2 received from the edge management system 40. The period or duration for which the maintenance token remains valid may be a configurable value which could be configured by edge store staff. For example, the maintenance token could be set to be valid for between 5 minutes and an hour, but more preferably about 30 minutes.

Both the BMC 50-A of Node A 30-A and the BMC 50-C of Node C 30-C receive the maintenance token 44 (see arrow labeled "4") from the edge management system 40 and may recognize Node B2 30-B2 as a replacement node, such as by polling the Universally Unique Identifier (UUID) for the replacement node (Node B2 30-B2) and finding that it is different than the UUID of the failed node 30-B being replaced. Using some predetermined rules or hierarchy, one of the BMC 50-A of Node A 30-A and the BMC 50-C of Node C 30-C may be elected to deploy the baseboard management controller configuration of the BMC 50-B of Node B 30-B to the BMC 50-B2 of the replacement node (Node B2 30-B2). For the purposes of this example, it is assumed that the BMC 50-A of Node A 30-A has been given responsibility of deploying the baseboard management configuration to the replacement node (Node B2 30-B2).

Although the BMC 50-A of the peer Node A 30-A does not have login credentials to the BMC 50-B2 of the replacement node (Node B2 30-B2), the BMC 50-A of the peer Node A 30-A sends the one-time token 44 received from the edge management system 40 to the BMC 50-B2 of the replacement node 30-B2 (see arrow labeled "5"). Since the maintenance token 44 received by the BMC 50-B2 of the replacement node (Node B2 30-B2) has been authenticated, the BMC 50-B2 of the replacement node (Node B2 30-B2) may authenticate the BMC 50-A of the peer Node A 30-A if the maintenance token 44 received from the BMC 50-A of the peer Node A 30-A matches the previously authenticated maintenance token 44. Furthermore, if the BMC 50-B2 of the replacement node (Node B2 30-B2) authenticates the BMC 50-A of the peer Node A as described, the BMC 50-B2 of the replacement node (Node B2 30-B2) may further grant administrative privileges to the BMC 50-A of Node A 30-A. The administrative privileges granted by the BMC 50-B2 of the replacement node (Node B2 30-B2) enable the BMC 50-A of the peer edge Node A 30-A to call Redfish application programming interfaces (APIs) on the BMC 50-B2 of the replacement node (Node B2 30-B2), such as to collect a hardware inventory from the BMC 50-B2 of the replacement node (Node B2 30-B2) and/or to deploy the previous backup of the BMC configuration 32 for the baseboard management controller 50-B of the failed node 30-B to the BMC 50-B2 of the replacement node (Node B2 30-B2) (see arrow labeled "6").

After the BMC 50-A of the Node A 30-A receives administrative privileges to manage the BMC 50-B2 of the replacement node (Node B2 30-B2), the BMC 50-A of Node A 30-A may collect hardware inventory information from the BMC 50-B2 of the replacement node (Node B2 30-B2) to check the consistency of the replacement node hardware with the peer node hardware. The hardware consistency check covers the critical hardware components for a cluster such as processors, memory, host network adapters. RAID/HBA controllers, and/or the number and size of cache/capacity drives, etc. Hardware consistency, in practice, helps to obtain better cluster performance. In one example, the hardware comparison may be performed between the replacement node (Node B2 30-B2) and the peer nodes 30-A. 30-C of the remaining BMC group members, and the comparison may look for consistency of the following items: CPU (model, frequency, and/or number of cores); Memory (size and/or frequency); NIC (model, number of ports and/or speed); Raid/HBA (model); and/or SSD/NVMe/HDD/M.2 (size and/or number of drives). The BMC 50-B2 of the replacement node (Node B2 30-B2) could broadcast its hardware inventory using Simple Service Discovery Protocol (SSDP), or the BMC 50-A of the neighboring peer Node A 30-A may obtain the hardware inventory data from the replacement node using Redfish APIs.

If the replacement node (Node B2 30-B2) fails the hardware consistency check, the BMC 50-B2 of the replacement node (Node B2 30-B2) may use light path and beep to indicate the hardware consistency check failure to a user. At the same time, the BMC 50-A of Node A 30-A may generate an event which can be read from its BMC portal or be detected by IT admins in a database so that the technicians can determine whether the replacement node should be added into another cluster.

After the replacement node (Node B2 30-B2) succeeds on the hardware consistency check, Node A may start a network topology consistency check. The network topology consistency check may include determining whether the replacement node (Node B2 30-B2) has a network adapter in the same PCIe slot (i.e., same PCIe slot ID), is connected to the same switch (i.e., the same Top-of-Rack (TOR) switch) and/or has other similar topology as the nodes with the other BMC federation group members in the edge cluster 20. In practice, network consistency could help reduce the imperceptible errors or help troubleshoot issues.

If the replacement node fails the network topology consistency check, the BMC 50-B2 of the replacement node (Node B2 30-B2) may use light path and beep to indicate the network topology consistency check failure. At the same time, the BMC 50-A of Node A 30-A may generate an event which can be read from its BMC portal or be detected by IT admins in a database so that the technicians can determine whether the replacement node should be added into another cluster. However, if the replacement node (Node B2 30-B2) succeeds in the network topology consistency check, the BMC 50-A of Node A 30-A may start to deploy the previous backup baseboard management configuration 32 of Node B (see Node B 30-B of FIG. 1) to the baseboard management controller 50-B2 of the replacement node (Node B2 30-B2). For example, the BMC 50-A of Node A may use Redfish application programming interfaces (APIs) to deploy the configuration 32. The IP address of the BMC 50-B2 of the replacement node (Node B2 30-B2) may be recovered as 10.10.10.2 as one of the recovered configurations. After the backup configuration has been deployed to the BMC 50-B2 of the replacement node (Node B2 30-B2), the replacement node is able to work in the edge cluster to fulfill its functions.

Figure 3:
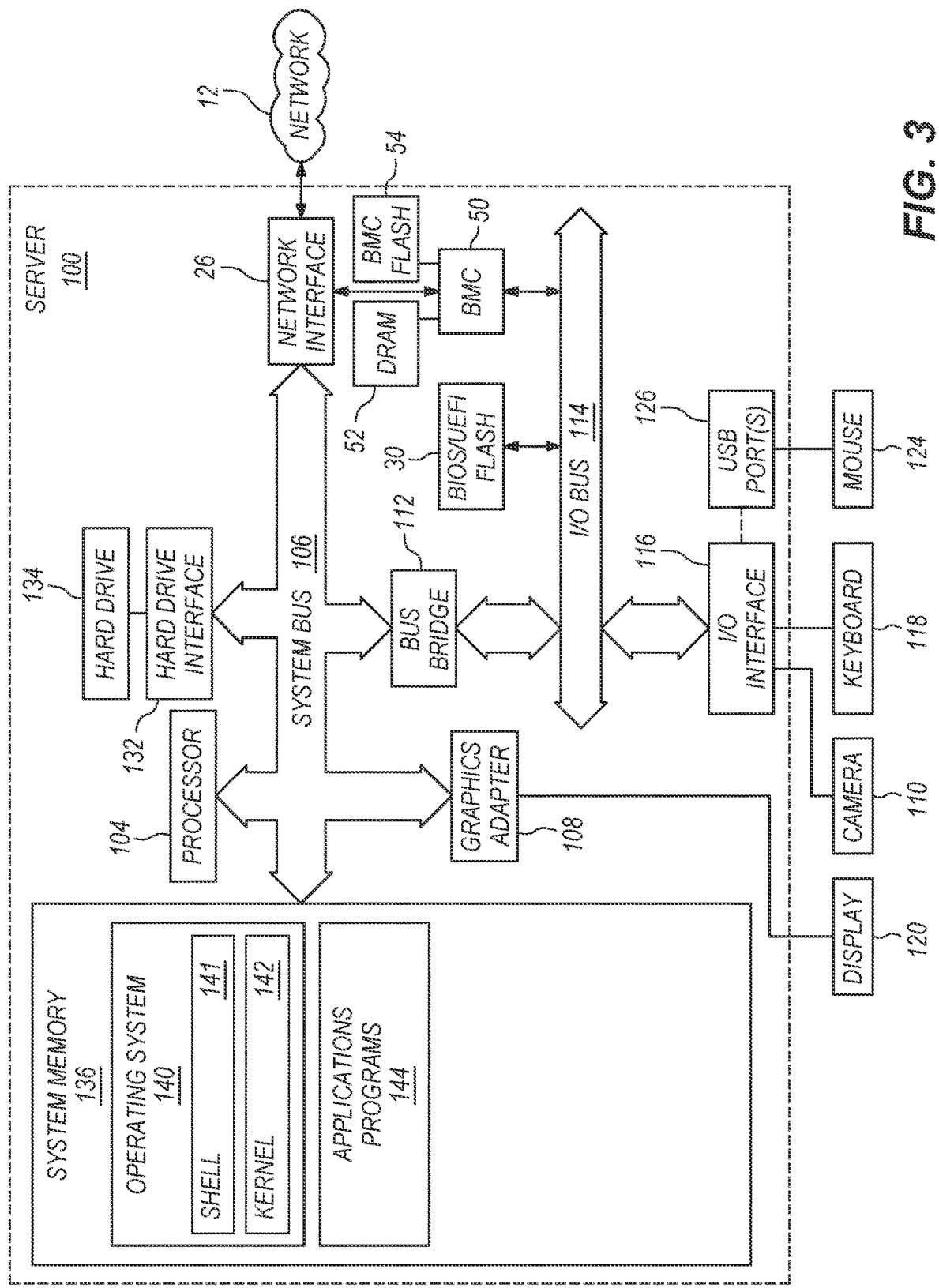
FIG. 3 is a diagram of a computer server according to some embodiments.

FIG. 3 is a diagram of a computer server 100 that may be representative of any of the nodes (Node A, Node B, Node C, Node B2) in the edge cluster 20, the edge management system 40, and/or the computer 14 shown in FIGS. 1 and 2. The server 100 includes a processor unit 104 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over a network using a network adapter or network interface controller 130.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the server 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer 100 may include application programs 144 stored in the system memory 136.

The server 100 may further include a management processor, such as the baseboard management controller (BMC) 50. The BMC may monitor and control various components of the server 100. However, the BMC may also communicate with various devices via the network interface 26 and network 12, such as to communicate with other baseboards management controllers in the same edge cluster. Still further, the BMC 50 may having its own Dynamic Random Access Memory (DRAM) 52 and/or BMC flash 54 as shown in FIG. 1.

Figure 4:
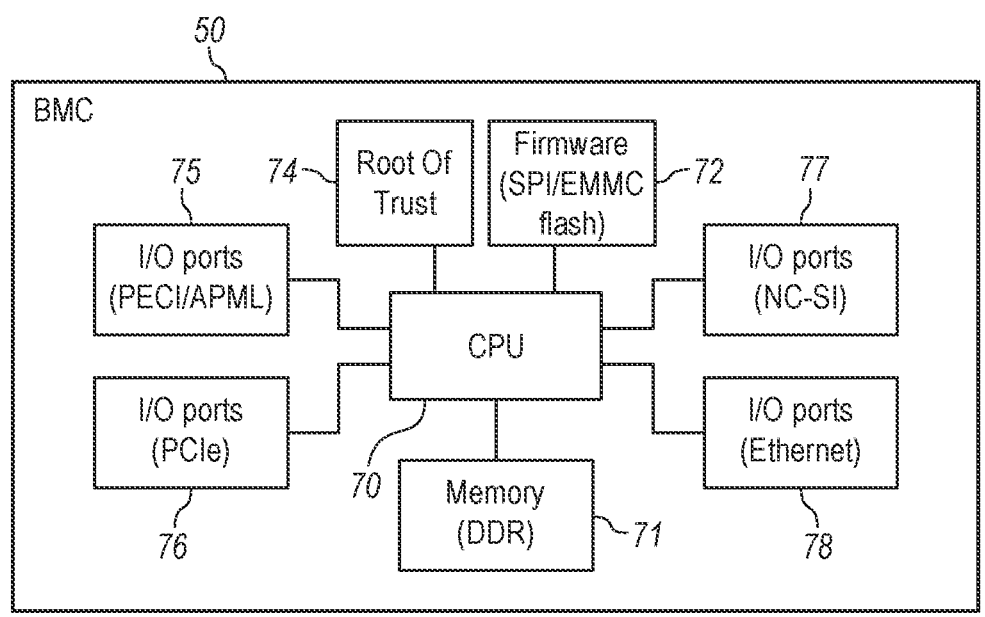
FIG. 4 is a diagram of the baseboard management controller (BMC) according to some embodiments.

FIG. 4 is a diagram of the baseboard management controller (BMC) 50 according to some embodiments. The BMC 50 is similar to a small computer or system on a chip (SoC), including a central processing unit (CPU) 70 (which is a separate entity from the central processing units 104 in FIG. 3), memory 71 (such as random-access memory (RAM) on a double data rate (DDR) bus), firmware 72 on a flash memory (such as an embedded multi-media card (eMMC) flash memory or a serial peripheral interface (SPI) flash memory), and a root of trust (RoT) chip 74. The BMC 50 further includes a wide variety of input/output ports. For example, the input/output (I/O) ports may include I/O ports 75 to the hardware components of the server, such as a Platform Environment Control Interface (PECI) port and/or an Advanced Platform Management Link (APML) port; I/O ports 76 to the hardware components of the servers and/or a network interface controller (NIC), such as a Peripheral Component Interconnect Express (PCIe) port; I/O ports 77 to the NIC, such as a network controller sideband interface (NC-SI) port; and I/O ports 78 to a network that accessible to an external user, such as an Ethernet port. The BMC 50 may use any one or more of these I/O ports to interact with hardware devices installed on the server, other baseboard management controllers within the federation, and the edge management system 40 (see FIGS. 1 and 2)

Figure 5:
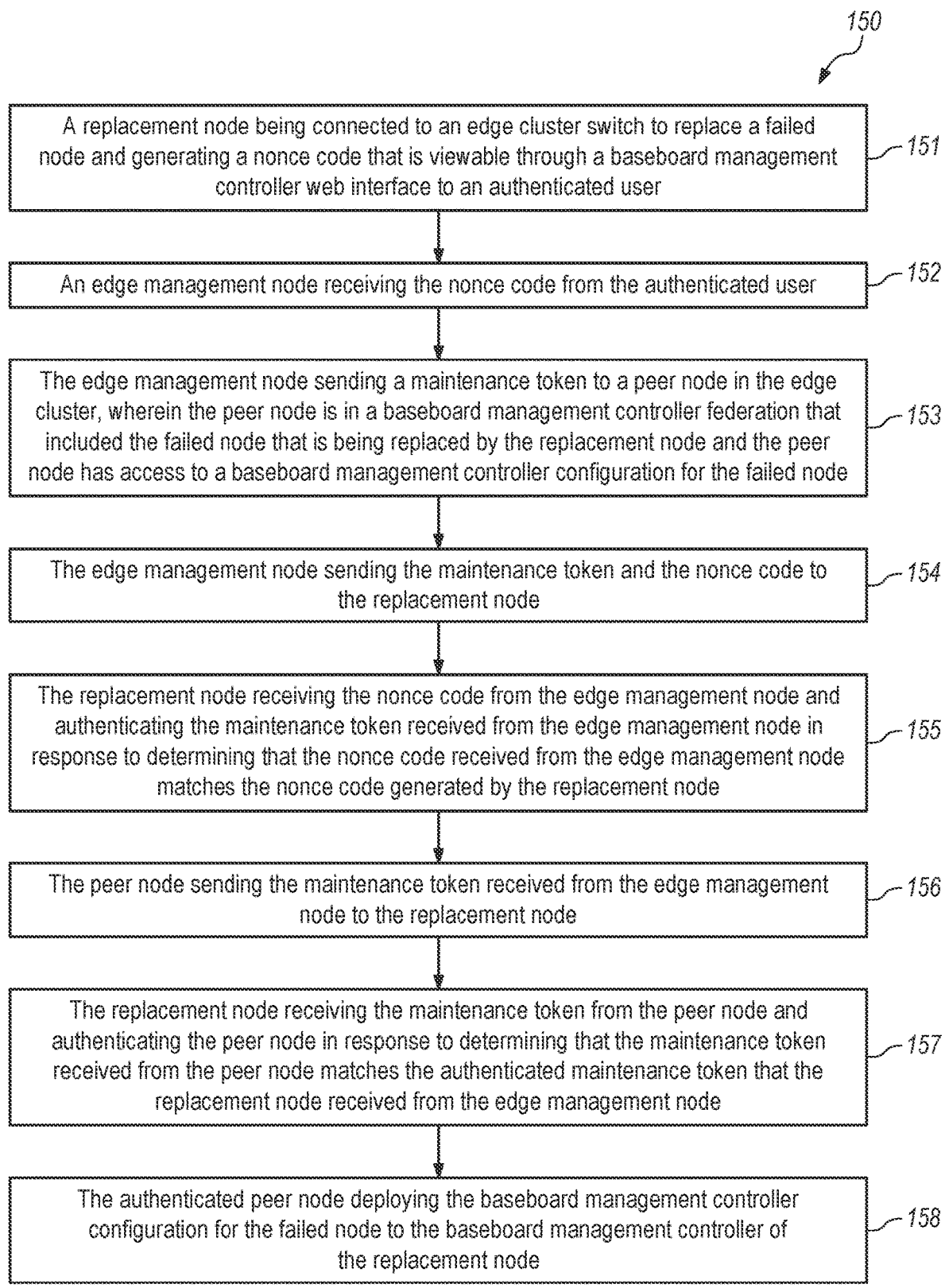
FIG. 5 is a flowchart of operations of a method involving a peer node within the baseboard management controller federation, a node replacing another of the peer nodes within the baseboard management controller federation, and an edge management node.

FIG. 5 is a flowchart of operations of a method 150 involving a peer node within the baseboard management controller federation, a node replacing another of the peer nodes within the baseboard management controller federation, and an edge management node. Step 151 includes a replacement node being connected to an edge cluster switch to replace a failed node and generating a nonce code that is viewable through a baseboard management controller web interface to an authenticated user. Step 152 includes an edge management node receiving the nonce code from the authenticated user. Step 153 includes the edge management node sending a maintenance token to a peer node in the edge cluster, wherein the peer node is in a baseboard management controller federation that included the failed node that is being replaced by the replacement node and the peer node has access to a baseboard management controller configuration for the failed node. Step 154 includes the edge management node sending the maintenance token and the nonce code to the replacement node. Step 155 includes the replacement node receiving the nonce code from the edge management node and authenticating the maintenance token received from the edge management node in response to determining that the nonce code received from edge management node matches the nonce code generated by the replacement node. Step 156 includes the peer node sending the maintenance token received from the edge management node to the replacement node. Step 157 includes the replacement node receiving the maintenance token from the peer node and authenticating the peer node in response to determining that the maintenance token received from the peer node matches the authenticated maintenance token that the replacement node received from the edge management node. Step 158 includes the authenticated peer node deploying the baseboard management controller configuration for the failed node to the baseboard management controller of the replacement node.

Figure 6:
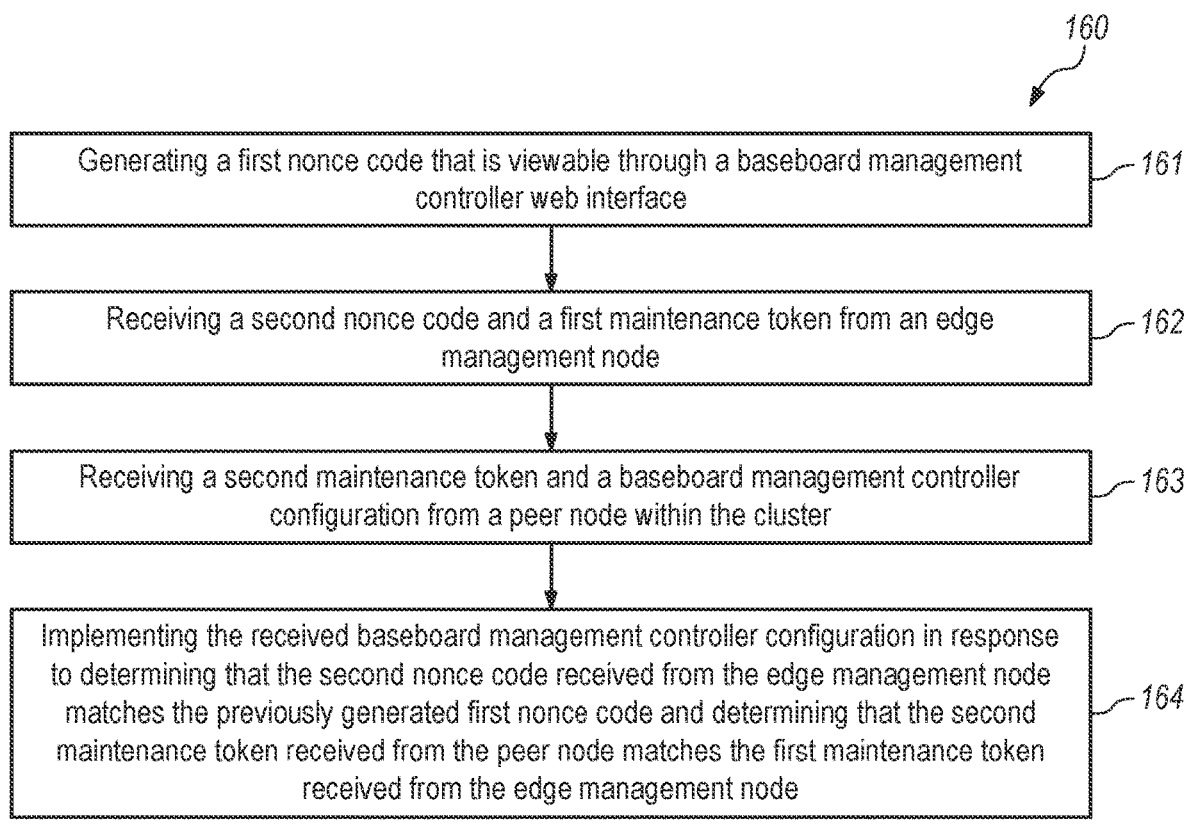
FIG. 6 is a flowchart of operations of the replacement node.

FIG. 6 is a flowchart of operations 160 of the replacement node. Operation 161 includes generating a first nonce code that is viewable through a baseboard management controller web interface. Operation 162 includes receiving a second nonce code and a first maintenance token from an edge management node. Operation 163 includes receiving a second maintenance token and a baseboard management controller configuration from a peer node within the cluster. Operation 164 includes implementing the received baseboard management controller configuration in response to determining that the second nonce code received from the edge management node matches the previously generated first nonce code and determining that the second maintenance token received from the peer node matches the first maintenance token received from the edge management node.

Figure 7:
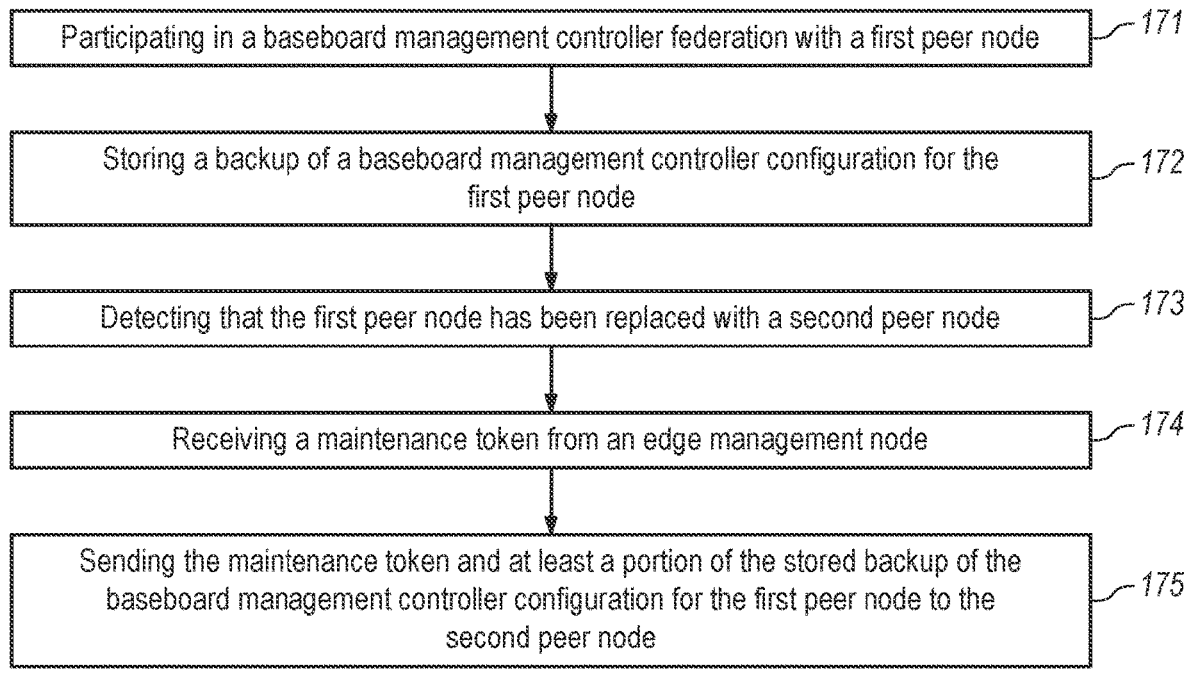
FIG. 7 is a flowchart of operations of the peer node within the baseboard management controller federation.

FIG. 7 is a flowchart of operations 170 of the peer node within the baseboard management controller federation. Operation 171 includes participating in a baseboard management controller federation with a first peer node. Operation 172 includes storing a backup of a baseboard management controller configuration for the first peer node. Operation 173 includes detecting that the first peer node has been replaced with a second peer node. Operation 174 includes receiving a maintenance token from an edge management node. Operation 175 includes sending the maintenance token and at least a portion of the stored backup of the baseboard management controller configuration for the first peer node to the second peer node.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
    a replacement node being connected to an edge cluster switch to replace a failed node and a baseboard management controller of the replacement node generating a nonce code that is viewable through a baseboard management controller web interface to an authenticated user;

an edge management node receiving the nonce code from the authenticated user;

the edge management node sending a maintenance token to a baseboard management controller of a peer node connected to the edge cluster switch, wherein the baseboard management controller of the peer node is in a baseboard management controller federation that included a baseboard management controller of the failed node and the baseboard management controller of the peer node stores a backup of a baseboard management controller configuration for the baseboard management controller of the failed node;

the edge management node sending the maintenance token and the nonce code to the baseboard management controller of the replacement node;

the baseboard management controller of the replacement node receiving the nonce code from the edge management node and authenticating the maintenance token received from the edge management node in response to determining that the nonce code received from the edge management node matches the nonce code generated by the baseboard management controller of the replacement node;

the baseboard management controller of the peer node sending the maintenance token received from the edge management node to the baseboard management controller of the replacement node;

the baseboard management controller of the replacement node receiving the maintenance token from the baseboard management controller of the peer node and authenticating the baseboard management controller of the peer node in response to determining that the maintenance token received from the baseboard management controller of the peer node matches the authenticated maintenance token that the baseboard management controller of the replacement node received from the edge management node; and the authenticated baseboard management controller of the peer node deploying the baseboard management controller configuration for the failed node to the baseboard management controller of the replacement node.

2. The method of claim 1, further comprising:

the authenticated baseboard management controller of the peer node obtaining a hardware inventory of the replacement node from the baseboard management controller of the replacement node; and the authenticated baseboard management controller of the peer node determining whether the hardware inventory is consistent with a hardware inventory of the peer node, wherein the stored baseboard management controller configuration is deployed on the baseboard management controller of the replacement node only in response to determining that the hardware inventory of the replacement node is consistent with the hardware inventory of the peer node.

3. The method of claim 1, further comprising:

the authenticated baseboard management controller of the peer node obtaining a network topology of the replacement node; and the authenticated baseboard management controller of the peer node determining whether the network topology of the replacement node is consistent with a network topology of the peer node, wherein the stored baseboard management controller configuration is deployed on the baseboard management controller of the replacement node only in response to determining that the network topology of the replacement node is consistent with the network topology of the peer node.

4. The method of claim 3, wherein the network topology of the replacement node is determined to be consistent with the network topology of the peer node if the replacement node uses a Peripheral Component Interconnect Express slot identifier for a network adapter that is the same as a Peripheral Component Interconnect Express slot identifier for a network adapter of the peer node.

5. The method of claim 3, wherein the network topology of the replacement node is determined to be consistent with the network topology of the peer node if the replacement node has a network adapter connected to the edge cluster switch to which a network adapter of the peer node is also connected.

6. The method of claim 1, wherein the maintenance token is valid for a predetermined duration after being sent by the edge management node.

7. The method of claim 1, the operations further comprising:

each baseboard management controller in the baseboard management controller federation periodically backing up the baseboard management controller configuration of each of the other baseboard management controllers in the baseboard management controller federation.

8. The method of claim 7, wherein the baseboard management controller configuration includes a baseboard management controller Internet Protocol address, a baseboard management controller Universally Unique Identifier, and/or Unified Extensible Firmware Interface configuration.

9. A computer program product comprising a non-volatile computer readable medium and non-transitory program instructions embodied therein, the program instructions being configured to be executable by a processor of a baseboard management controller of a replacement node to cause the processor to perform operations comprising:

generating, in the replacement node being connected to an edge cluster switch, a first nonce code that is viewable through a baseboard management controller web interface;

receiving a second nonce code and a first maintenance token from an edge management node;

receiving a second maintenance token and a baseboard management controller configuration from a peer node within an edge cluster, wherein the baseboard management controller of the peer node was in a baseboard management controller federation that included a baseboard management controller of a failed node being replaced by the replacement node and stored a backup of the baseboard management controller configuration for the baseboard management controller of the failed node; and implementing the received baseboard management controller configuration in response to determining that the second nonce code received from the edge management node matches the previously generated first nonce code and determining that the second maintenance token received from the baseboard management controller of the peer node matches the first maintenance token received from the edge management node.

10. The computer program product of claim 9, the operations further comprising:

granting administrative privileges to the baseboard management controller of the peer node in response to determining that the second nonce code received from the edge management node matches the previously generated first nonce code and determining that the second maintenance token received from the baseboard management controller of the peer node matches the first maintenance token received from the edge management node.

11. The computer program product of claim 10, the operations further comprising:
providing a hardware inventory to the baseboard management controller of the peer node in response to a hardware inventory request received from the baseboard management controller of the peer node that has been granted the administrative privileges, wherein the hardware inventory identifies hardware in a local the replacement node.

12. The computer program product of claim 10, the operations further comprising:
providing network topology data to the baseboard management controller of the peer node in response to a network topology request received from the baseboard management controller of the peer node that has been granted the administrative privileges, wherein the network topology data identifies a Peripheral Component Interconnect Express slot identifier where a host network adapter is installed in the replacement node and/or identifies a network switch to which the replacement node is connected.

13. A computer program product comprising a non-volatile computer readable medium and non-transitory program instructions embodied therein, the program instructions being configured to be executable by a processor to cause the processor of a baseboard management controller to perform operations comprising:
participating in a baseboard management controller federation with a baseboard management controller of a first peer node;
storing a backup of a baseboard management controller configuration for the baseboard management controller of the first peer node;
detecting that the first peer node has been replaced with a replacement node;
receiving a maintenance token from an edge management node, wherein a baseboard management controller of the replacement node receives a nonce code and a matching maintenance token from the edge management node, and wherein the baseboard management controller of the replacement node uses the nonce code to authenticate the matching maintenance token; and
sending the maintenance token and at least a portion of the stored backup of the baseboard management controller configuration for the baseboard management controller of the first peer node to the baseboard management controller of the replacement node, wherein the baseboard management controller of the replacement node authenticates the baseboard management controller of the peer node and implements the baseboard management controller configuration received from the baseboard management controller of the peer node if the maintenance token received from the baseboard management controller of the peer node matches the authenticated maintenance token that the baseboard management controller of the replacement node received from the edge management node.

14. The computer program product of claim 13, the operations further comprising:
obtaining a hardware inventory of the replacement node from the baseboard management controller of the replacement node; and
determining whether the hardware inventory of the replacement node is consistent with a hardware inventory of one or more peer nodes in the baseboard management controller federation, wherein the stored backup of the baseboard management controller configuration is sent to the baseboard management controller of the replacement node only in response to determining that the hardware inventory of the replacement node is consistent with the hardware inventory of the one or more peer nodes in the baseboard management controller federation.

15. The computer program product of claim 14, the operations further comprising:
generating a hardware inconsistency event that is viewable through a baseboard management controller web interface in response to determining that the hardware inventory of the replacement node is not consistent with the hardware inventory of the one or more peer nodes in the baseboard management controller federation.

16. The computer program product of claim 14, the operations further comprising:
obtaining network topology data of the replacement node from the baseboard management controller of the replacement node; and
determining whether the network topology data of the replacement node is consistent with a network topology of one or more peer nodes in the baseboard management controller federation, wherein the stored backup of the baseboard management controller configuration for the first peer node is sent to the baseboard management controller of the replacement node only in response to determining that the network topology data of the replacement node is consistent with the network topology of the one or more peer nodes in the baseboard management controller federation.

17. The computer program product of claim 16, wherein the network topology data identifies a Peripheral Component Interconnect Express slot identifier where a host network adapter is installed in a local node including the baseboard management controller and/or identifies a network switch to which the local node is connected.

18. The computer program product of claim 16, the operations further comprising:
generating a network topology inconsistency event that is viewable through a baseboard management controller web interface in response to determining that the network topology data of the replacement node is not consistent with the network topology of the one or more peer nodes in the baseboard management controller federation.

19. The computer program product of claim 13, wherein the stored backup of the baseboard management controller configuration includes a baseboard management controller Internet Protocol address, a baseboard management controller Universally Unique Identifier, and/or Unified Extensible Firmware Interface configuration.

20. The computer program product of claim 19, the operations further comprising:
identifying that the replacement node is a replacement for the first peer node in response to detecting that the replacement node has a Universally Unique Identifier that is different from the Universally Unique Identifier in the stored backup of the baseboard management controller configuration for the first peer node.

* * * * *